United States Patent [19]

Fox

[11] Patent Number: 4,672,917
[45] Date of Patent: Jun. 16, 1987

[54] FEEDER

[76] Inventor: Harvey Z. Fox, Rte. 2, Box 726, Colby, Wis. 54421

[21] Appl. No.: 706,261

[22] Filed: Feb. 26, 1985

[51] Int. Cl.$^4$ .............................................. A01K 5/02
[52] U.S. Cl. ............................. 119/52 AF; 119/52 B
[58] Field of Search ............... 119/52 AF, 52 B, 52 R

[56] References Cited

U.S. PATENT DOCUMENTS

| 3,587,529 | 6/1971 | Wienert et al. | 119/52 B X |
| 4,475,481 | 10/1984 | Carroll | 119/51 R |

FOREIGN PATENT DOCUMENTS

| 2949240 | 9/1981 | Fed. Rep. of Germany | 119/52 AF |
| WO79/00147 | 6/1980 | PCT Int'l Appl. | 119/52 B |
| 391371 | 8/1965 | Switzerland | 119/52 B |

Primary Examiner—Robert P. Swiatek

[57] ABSTRACT

Method and apparatus are disclosed for feeding farm animals. The apparatus includes a movable feeding device mounted to a trolley which is in turn carried by a rail. The movable feeding device follows a path which includes a plurality of stalls, each of which has a farm animal therein. When the movable feeding device stops adjacent a stall, an animal is identified, and the dispensing of a pre-determined amount of food for that animal begins. If the animal moves its head away from the feeding bowl before the pre-determined amount has been dispensed, the movable feeding means waits a predetermined amount of time before moving to next stall. After an animal has completed its consumption of food, the movable feeding device automatically moves to an adjacent stall, only after predetermined time has elapsed, identifies another animal, and repeats the process. The trolley includes a drive wheel which engages the rail in a frictional manner. The amount of frictional force is adjustable to provide a safety feature should the movable feeding device encounter an obstacle in the barn.

14 Claims, 3 Drawing Figures

FEEDER

TECHNICAL FIELD

This invention relates to the art of animal husbandry, particularly the art of feeding farm animals prescribed amounts of food.

BACKGROUND ART

Various techniques are known for feeding farm animals. These techniques range from extremely simple methods, such as simply throwing food on the ground in an area having animals, to quite sophisticated techniques. The more sophisticated techniques have been designed to accomplish at least two objectives. The first objective is to provide a means for delivering food to the animals in an efficient manner so that more animals may be tended by each farm worker. Another objective is to provide a specific amount of food to each animal to thereby make the output (or growth) of each animal greater for the total amount of food consumed.

U.S. Pat. Nos. 2,914,023 (St. Pierre) and 3,156,215 (Barker) are representative of prior art devices directed to accomplishing these objectives. The St. Pierre patent shows a system for feeding farm animals wherein an elevated conveyor system communicates with a plurality of downwardly-extending columns, each of which terminates in a feeding trough. The conveyor supplies the upper end of each of the columns with food which then falls through the column into a trough. An adjustment plate is provided in each column to allow the farmer to vary the amount of food supplied to each trough. The patent to Barker shows a system for feeding poultry and includes a movable hopper mounted to an elevated rail. The hopper moves above a continuous feeding trough and has an outlet orifice which deposits food in the trough as the hopper moves along the rail.

It is also known to provide a stationery feeder for an animal wherein a particular animal is identified and an amount of food is dispensed corresponding to the predetermined needs of that animal. For example, U.S. Pat. Nos. 3,557,758; 3,750,626; 3,516,575; 3,541,995; and 4,350,119 teach systems having animal identification systems which dispense an amount of food corresponding to the requirements of a particular animal.

SUMMARY OF THE INVENTION

The systems provided by the prior art are expensive and are not useful on farms where animals are kept in individual stalls. For example, the known free-stall feeders are inefficient in that a single feeder is not practical for use with a large plurality of animals. It is thus necessary to provide a large number of these feeders, and the consequent cost is quite high. Use of one of these for each stall in a dairy farm having a large number of cows requires an extremely large expense which will likely not be recovered.

In the devices shown, for example, by Barker and St. Pierre, the ability to identify an animal is extremely limited, and in the Barker patent this is virtually impossible. In a device such as that shown by St. Pierre, it must be assumed that a particular cow will always be at a particular location, and there is no way to determine whether the cow has eaten its entire portion or not. Furthermore, the structure shown by St. Pierre is quite complicated and would be extremely expensive to install.

In accordance with the invention, a unique method and apparatus are provided which result in a large increase in efficiency of tending farm animals. A hopper containing at least one kind of animal feed is mounted for movement along a path which includes a plurality of stalls, each of which has an animal therein. The hopper is mounted to a trolley which is preferably carried by an elevated rail, and the rail is easily installed in an existing barn, thus resulting in low installation costs. In addition, a source of electrical power is mounted adjacent the rail, and the trolley has an electric motor. A control box is carried by the trolley to provide signals to the electric motor driving the trolley and to electric motors which operate augers to dispense the feed. The hopper preferably contains several compartments to allow feed having different characteristics to be dispensed in varying amounts depending upon a particular animal's requirements.

A feeding bowl extends outwardly from the bottom of the hopper, and the discharge opening of the hopper is located with respect to the bowl so that feed from each of the compartments is dispensed into the bowl. One end of the bowl carries an animal-identification unit which supplies signals to a controller. Each animal has an identification tag on it, for example, a tag may hang from a chain around the animal's neck such that when the animal approaches the feeding bowl, the tag is in operative contact with the animal identification means on the bowl. The animal-identification means first identifies the animal, and then communicates with the controller to determine the amount of each type of feed to be dispensed to that animal.

The trolley includes a sensing element for determining when the hopper is adjacent a particular stall so that the hopper moves from stall-to-stall and stops in front of each stall for a period of time. The feed is dispensed at a rate determined to be the average rate at which an animal of the particular type consumes food. When the prescribed amount of feed has been dispensed, the hopper waits a pre-determined delay time to allow the animal to determine that there is no more feed being dispensed and to remove its head from the feeding bowl. Then, the hopper moves to the next stall, identifies the animal, and dispenses the prescribed amount of feed. If the animal moves its head away from the feeding bowl before the prescribed amount of feed has been dispensed, the control means begins a time-delay period. If the animal's head remains away from the feeding bowl for a period of time longer than the pre-determined delay period, the controller instructs the hopper to move to the next stall. Feed dispensing stops immediately after an animal removes her head. Of course, this information is also recorded for later communication to the operator. If the animal's head returns to the feeding bowl within a period of time shorter than the pre-determined delay period, the hopper continues dispensing feed until the prescribed amount has been dispensed.

The trolley carrying the hopper includes an adjustable drive wheel which engages a surface of the elevated rail. The drive wheel is carried by a frame movable with respect to the remainder of the trolley to allow adjustment of the frictional force between the drive wheel and the rail. This frictional force is adjusted so that the hopper moves easily and so that the wheel slips with respect to the rail should the hopper encounter an obstacle.

An object of this invention is to provide a method for feeding animals wherein a movable feeding element moves along a path including a plurality of animals and wherein each animal is separately identified.

A further object is this invention is to provide a method of feeding animals wherein each animal receives an allotment of food corresponding to a predetermined amount and wherein food is dispensed at a rate approximately equal to that at which the animal will consume the food.

Yet another object of this invention is to provide a method for feeding animals wherein the amount of food actually consumed is easily determined by causing a dispensing means to stop dispensing food if an animal has moved its head out of the feeding bowl for a period of time longer than a pre-selected delay time.

A still further object of this invention is to provide an apparatus wherein a hopper is movable along a path including a plurality of animal locations and which includes animal identification means for allowing a predetermined amount of food to be dispensed.

A still further object of this invention is to provide an apparatus wherein a feeding means is carried by a trolley carried by an elevated rail to provide an easily-installed means for efficiently feeding farm animals.

DETAILED DESCRIPTION OF THE INVENTION

Figure 1:
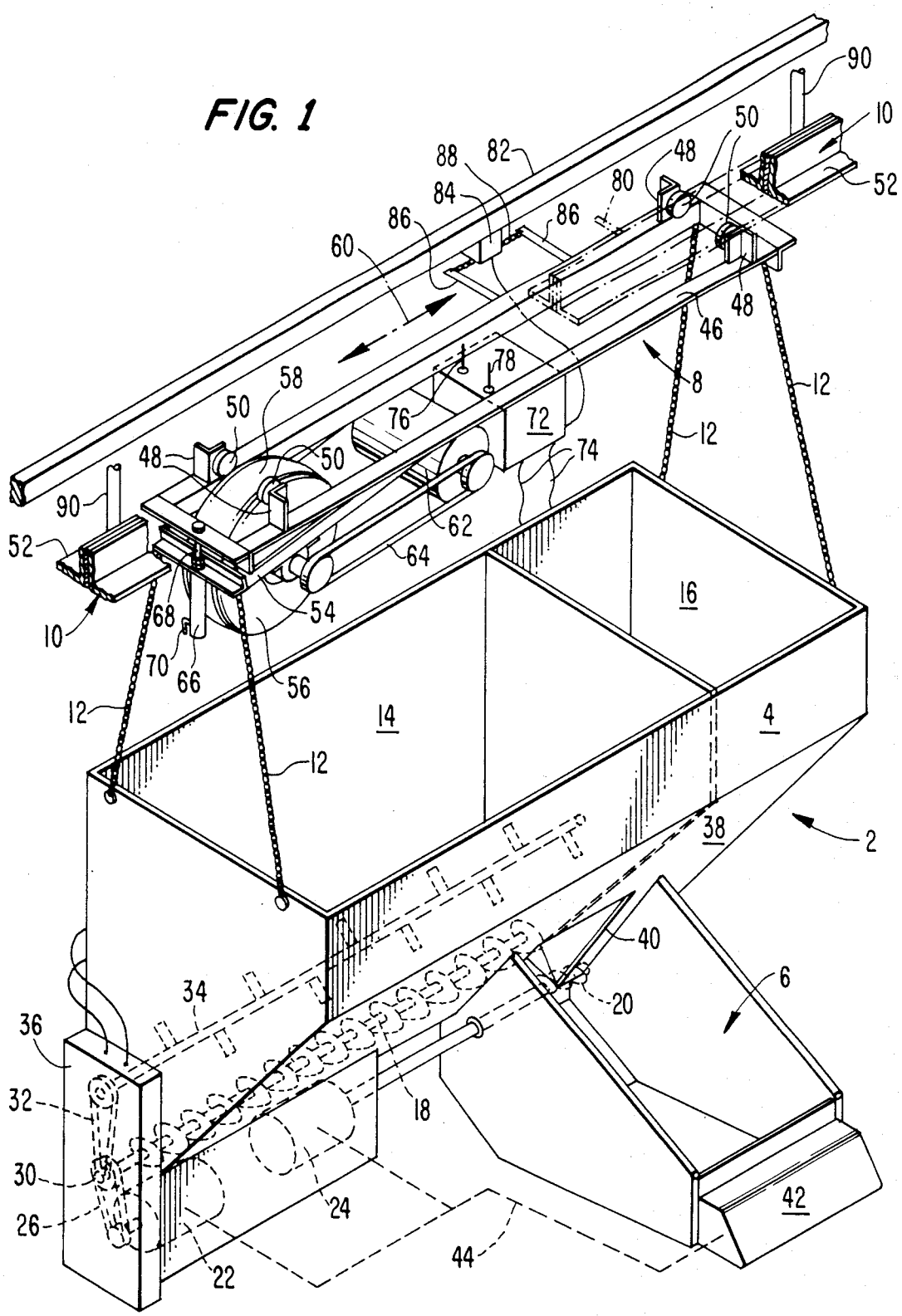
FIG. 1 is a perspective view of an apparatus in accordance with the invention.

FIG. 1 shows a preferred embodiment of a movable feeder in accordance with the invention. While the preferred embodiment has been designed with particular reference to the feeding of cows, it will be appreciated that the principles of the invention can be applied to a wide variety of farm animals.

A movable feeding means 2 includes a hopper portion and a feeding bowl 6. The movable feeding means 2 is suspended from a trolley 8 which is in turn mounted to a rail 10. In the preferred embodiment, the movable feeder means 2 is suspended from trolley 8 by flexible elements 12, which may be chains. It will be appreciated that the flexible elements 12 allow the movable feeding means 2 to have some degree of freedom of movement with respect to the trolley 8.

Hopper 4 preferably includes a plurality of compartments, such as compartments 14 and 16. Each of these compartments preferably contains a particular kind of feed, such as roughage or protein. It will be appreciated that the structure allows the various types of feed to be combined in pre-selected proportions. Hopper 4 further includes a pair of augers. Auger 18 extends into compartment 14, while auger 20 extends into compartment 16. Auger 18 is preferably driven by electric motor 22, and auger 20 is driven by electric motor 24. Auger 18 is driven by a chain 26 which cooperates with a sprocket 28 to rotate auger 18. Attached to sprocket 28 is a second sprocket 30 which is connected to a roller chain 32, which is in turn connected to an agitator 34. The agitater 34 extends into compartment 14 to ensure that the food in compartment 14 is evenly dispensed. A housing 36 covers the pulleys and belts which drive auger 18 and agitator 34.

Movable feeder means 2 includes a sloping wall 38 having an opening 40 therein. The opening 40 allows feed from compartments 14 and 16 to be dispensed into feeding bowl 6. Attached to the front of feeding bowl 6 is an animal identification means 42 which is illustratively shown connected to motors 22 and 24 by conductors 44. It will be appreciated that animal identification means 42 is also connected to a control means and a controller as will be more fully described below.

Trolley 8 includes a frame 46. Attached to frame 46 are a plurality of upstanding posts 48, each of which has a roller 50 thereon. Each roller 50 engages a flat surface 52 of the rail 10 whereby the frame 8 is adapted to easily move along the rail 10. In addition, the trolley preferably includes guide wheels (not shown) mounted for rotation about a vertical axis and which engage edges of the horizontal surfaces 52 to provide stability in a horizontal direction.

Pivotally attached to frame 8 is a movable frame 54 which carries a drive wheel 56. Outer surface 58 engages an undersurface of rail 10 to drive the trolley 8 in directions indicated by arrows 60. Drive wheel 56 is powered by electric motor 62 which is shown connected to the drive wheel by a roller chain 64.

The amount of force applied between outer surface 58 and rail 10 may be adjusted by adjusting the position of movable frame 54 with respect to frame 58. This adjustment is provided by a nut 66 which cooperates with a bolt 68. Nut 66 has a handle 70 to allow easy rotation of the nut to facilitate adjustment of movable frame 54. Adjusting the force applied by drive wheel 56 adjusts the maximum available frictional driving force applied to trolley 8. The adjustment is such that drive wheel 56 will slip when an obstruction is encountered to prevent damage. Control unit 72 is preferably designed so that slippage of drive wheel 56 causes motor 62 to reverse to cause hopper 4 to move away from the obstruction to continue feeding unobstructed animals.

Also attached to trolley 8 is a control unit 72 having electronic elements therein for controlling movement of the movable feeder means in accordance with a scheme which will be more fully described below. Control unit 72 communicates with electric motors 22, 24 and 62 by way of conductors 74. Extending upwardly from control unit 72, or located in structures separate from control unit 72, are probes 76 and 78. Probe 76 cooperates with arm 80 to identify the location of an animal-holding stall. When the probe 76 engages arm 80, a switch is activated, and control unit 72 instructs motor 62 to stop. This also begins a sequence of steps which eventually results in the motor 62 being re-activated to move the movable feeder means to another location. Probe 78 cooperates with another arm (not shown) to indicate that the movable feeding means has reached the end of a line of travel and to cause the motor 62 to reverse.

When an obstruction is encountered, control unit 72 reverses motor 62 to drive the trolley and the feeder in the opposite direction. The preferred sensing mechanism is to sense slippage of wheel 56.

Power is supplied to control unit 72 through an elongate conductor 82 which is mounted adjacent rail 10. Elongate conductor 82 is preferably U-shaped in cross section and includes a plurality of conductors (not shown) on an interior surface. These conductors are engaged by a movable element 84 which is caused to move with trolley 8 by means of arms 86 and flexible connectors 88. The conductors on the interior of elongate conductor 82 provide electrical power to motors 22, 24, and 62, and also allow control unit 72 to communicate with a stationary controller (not shown).

Figure 2:
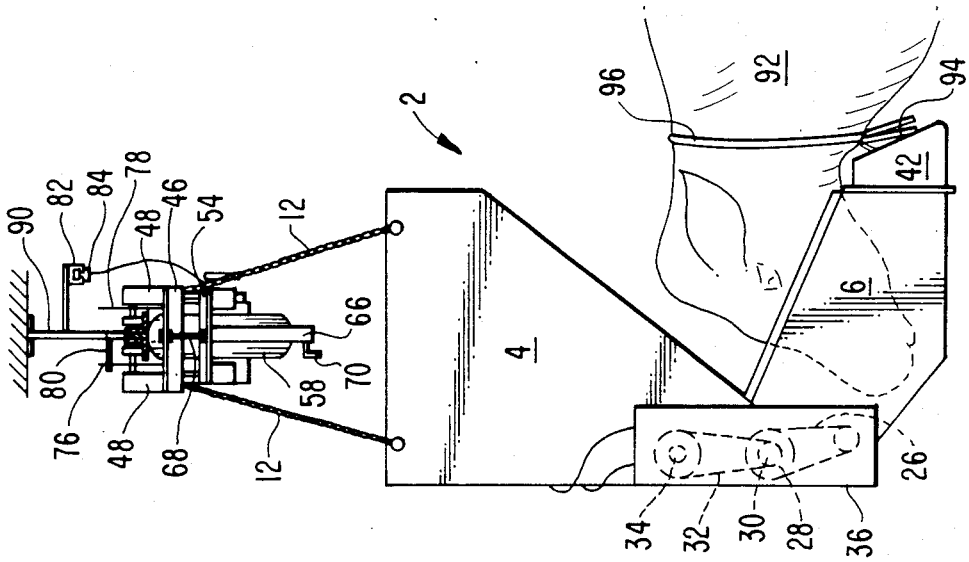
FIG. 2 is an end view of the apparatus shown in FIG. 1 and illustrating a feeding animal.

Rail 10 is supported from the ceiling of a barn by support pipes 90 and elongate conductor 82 can be supported by pipes extending outwardly from support pipes 90 as shown in FIG. 2.

FIG. 2 shows an end view of the apparatus shown in FIG. 1 and illustrates how an animal such as a cow 92 can eat feed which has been dispensed into feeding bowl 6. Attached to cow 92 is a tag 94 which will engage animal identifying means 42 when the animal is feeding. Tag 94 may be secured to the neck of a cow 92 by a band 96. The animal-identification means and tag 94 may be of a construction which is known in the art.

Figure 3:
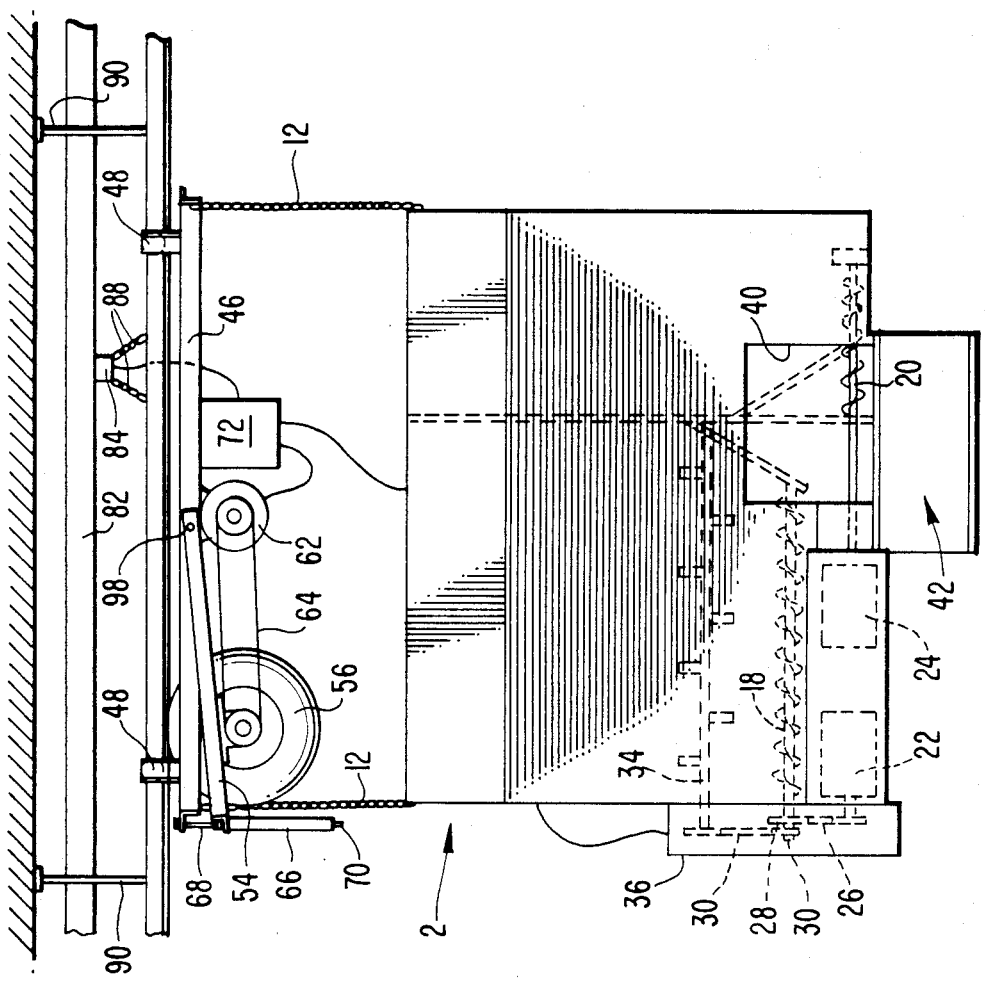
FIG. 3 is a front view of the apparatus shown in FIG. 1.

FIG. 3 is a front view of the apparatus shown in FIGS. 1 and 2. The pivot pin 98 which secures one end of the movable frame 54 to frame 46 is more clearly shown in this figure.

OPERATION

Operation of the above-described apparatus is preferably as follows.

Compartments 14 and 16 are loaded with separate types of feed, and control unit 72 is instructed to cause motor 62 to drive trolley 8 along rail 10. When probe 76 engages an arm 80, control unit 72 instructs motor 62 to stop. Arm 80 is located such that when this occurs, feeding bowl 6 will be adjacent a stall having an animal such as cow 92. The cow then naturally places its mouth in the feeding bowl 6 which causes tag 94 to communicate with animal-identifying means 42 as is known in the art. Animal-identifying means 42 communicates with control unit 72 which in turn may communicate with an external controller (not shown). The amount of feed to be dispensed to the particular cow 92 is thus communicated to control unit 72 which causes motors 22 and 24 to operate. Augers 18 and 20 thus dispense respective amounts of feed contained in compartments 14 and 16 into bowl 6. The rate at which the feed is dispensed is that at which an average cow, or other selected animal, will consume the feed. The cow continues feeding until it either has had enough food, moves its head away, for example, to drink, or until a pre-determined amount of feed has been dispensed. If cow 92 moves its head away from the feeding bowl prior to the dispensing of a pre-determined amount of food, control unit 72 initiates the measuring of a time delay period. The motors 22 and 24 will not continue dispensing feed during this time delay period to allow the cow to obtain a drink of water or the like. If the cow returns to the feeding bowl within the pre-determined delay period, feed will again start to flow dispensing feed. On the other hand, if the cow does not return its head to the feeding bowl within the prescribed time-delay, motor 62 is activated to cause the movable feeding means to advance to the next adjacent stall. If the cow continues eating until the pre-determined amount of feed has been dispensed, the time-delay period is again initiated to allow the cow to complete the consumption of the dispensed feed and to sense that no additional feed is to be available. Thus, the cow will naturally move its head away from the feeding bowl 6 to allow the movable feeding unit 2 to advance to the next stall.

Use of flexible members 12 and a bowl extending outwardly from the hopper reduces the likelihood of harm to an animal if the feeding means begins to move when the cow's head is still in the bowl.

The time-delay is adjustable, and may be anywhere from, for example, 0 to 300 seconds. Because the feed is dispensed at the rate at which an average animal consumes feed, the small amount of feed remaining in the bowl when the dispensing is terminated by a cow's stopping its consumption prior to dispensing the pre-determined amount of feed.

It will be appreciated that the above-described method and apparatus allow a single unit to feed a large number of animals with a high degree of control over the consumption of feed by each animal. The apparatus operates automatically and therefore requires very little supervision to allow the farmer to attend to other tasks. Each animal's consumption of feed is easily monitored and changed to greatly improve the management of each animal.

Modification of the invention within the scope of the appended claims will be apparent to those of ordinary skill in the art.

What is claimed is:

1. Apparatus for feeding animals in a plurality of locations comprising a plurality of animal location indicating means, movable feeder means comprising identifying means for identifying a particular animal, dispensing means for dispensing an amount of feed corresponding to said particular animal, and drive means for moving said movable feeder means along a path which includes said plurality of animal locations, wherein said drive means comprises track means for supporting said movable feeder means and trolley means carried by said track means and attached to said movable feeder means, said trolley means comprising friction means which engages said track means to drive said trolley means along said track means, said frictional means being capable of slipping when an obstacle is encountered whereby movement of said movable feeder means is stopped and said drive means is reversed to back away from said obstruction to feed the animals up to the obstruction when it again will reverse until said obstruction is removed, wherein said frictional means is a wheel having a surface in engagement with said track means, said frictional means including means for adjusting the force exerted by said wheel on said track.

2. Apparatus according to claim 1 wherein said means for adjusting comprises a frame pivotally mounted to another portion of said trolley means.

3. Apparatus according to claim 2 wherein said track means is above said movable feeder means and wherein said movable feeder means is attached to said trolley means by flexible means which permits relative motion between said movable feeder means and said trolley means.

4. Apparatus according to claim 3 further comprising power means for supplying electric power to said trolley means.

5. Apparatus according to claim 4 further comprising control means for controlling the operation of said dispensing means in response to signals from said identifying means.

6. Apparatus according to claim 5 wherein said dispensing means comprises a plurality of hoppers and auger means associated with each of said hoppers, whereby feed having different characteristics may be selectively dispensed.

7. Apparatus according to claim 1 comprising control means for controlling the operation of said dispensing means in response to signals from said identifying means.

8. Apparatus according to claim 7 wherein said control means causes said dispensing means to dispense feed at a rate approximately equal to the rate at which said animals normally consume feed.

9. Apparatus according to claim 8 wherein said control means also controls said drive means and activates said drive means to move said movable feeder means from a first location to a second location only after a predetermined time interval has elapsed, said time interval beginning when either said amount of feed has been dispensed or said animal moves said identifying means away from said movable feeder means.

10. Apparatus according to claim 9 wherein said movable feeder means comprises a plurality of hoppers for receiving a plurality of types of feed and said drive means comprises trolley means carried by a rail means, said movable feeder means being suspended from said trolley means.

11. Apparatus for feeding a plurality of animals comprising movable feeder means for automatically dispensing feed for each of said animals sequentially, movable trolley means supporting said movable feeder means, track means supporting said movable trolley means and for guiding said movable trolley means along a path, said trolley means comprising drive means for driving said movable trolley means along said track means, said drive means comprising adjustable slipping means engaging said track means for allowing said trolley means to be stopped when said drive means is activated and said trolley means or said feeder means engages an obstacle and further comprising means for sensing the engagement of said feeder means with an obstacle and for reversing the direction of said trolley means in response to said sensing.

12. Apparatus according to claim 11 wherein said means for sensing comprises means for detecting slippage of said slipping means and for reversing the direction of said drive means in response to a detected slippage.

13. Apparatus according to claim 12 wherein said feeder means is connected to said trolley means by flexible support elements whereby said feeder means is movable with respect to said trolley means.

14. Apparatus according to claim 11 wherein said adjustable slipping means comprises a frame pivotally mounted to said trolley means and supporting a wheel which engages said track means.

* * * * *